US012379518B2

(12) United States Patent
Wijeratne (10) Patent No.: US 12,379,518 B2
(45) Date of Patent: Aug. 5, 2025

(54) METHODS AND SYSTEMS FOR DETECTING GUNPOWDER

(71) Applicant: Toyota Motor North America, Inc., Plano, TX (US)

(72) Inventor: Gupta G. K. Wijeratne, Prosper, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 18/297,095

(22) Filed: Apr. 7, 2023

(65) Prior Publication Data
US 2024/0337769 A1    Oct. 10, 2024

(51) Int. Cl.
*G01V 3/08*    (2006.01)
(52) U.S. Cl.
CPC .................... *G01V 3/088* (2013.01)
(58) Field of Classification Search
CPC .............. G01V 3/088; G01R 33/1276
USPC ........................ 324/630, 629, 600
See application file for complete search history.

(56) References Cited

U.S. PATENT DOCUMENTS

| 5,452,639 | A | 9/1995 | Aulenbacher et al. |
| 11,067,713 | B2 * | 7/2021 | Aponte Luis .......... G01V 3/088 |
| 11,300,541 | B2 | 4/2022 | Afilani |
| 11,964,741 | B2 * | 4/2024 | Claus ................ G01V 3/088 |
| 2014/0361777 | A1 * | 12/2014 | Marsala .............. G01V 3/081 |
| | | | 324/348 |
| 2018/0329103 | A1 * | 11/2018 | Colombo ............ G01V 3/082 |
| 2022/0137249 | A1 * | 5/2022 | Zlobinskij .......... G01V 3/081 |
| | | | 324/200 |
| 2024/0295670 | A1 * | 9/2024 | Kang .................. G01V 3/104 |

FOREIGN PATENT DOCUMENTS

| JP | 2005147886 A | 6/2005 |
| KR | 20050099963 A | 10/2005 |
| RU | 2719001 C2 | 4/2020 |
| WO | 2020256906 A1 | 12/2020 |

OTHER PUBLICATIONS

Solution Sensors, Inc., "Detecting Threats to Improve Security," https://www.fundable.com/solution-sensors-inc, Oct. 19, 2022.

* cited by examiner

*Primary Examiner* — Giovanni Astacio-Oquendo
(74) *Attorney, Agent, or Firm* — Dinsmore & Shohl LLP (57) ABSTRACT

Methods and systems for detecting gunpowder are provided. The method includes collecting sensor data from a plurality of vehicles each comprising one or more gunpowder sensors, detecting presence of gunpowder based on the sensor data of the gunpowder sensors, determining a detection location where the presence of gunpowder is detected based on vehicle location data from the vehicles, determining whether the detection of the presence of gunpowder is false positive based on the detection location and map data from a crowdsourced map, and communicating the detection of the presence of gunpowder in response to determining that the detection of the presence of gunpowder is not false positive.

20 Claims, 5 Drawing Sheets

METHODS AND SYSTEMS FOR DETECTING GUNPOWDER

TECHNICAL FIELD

The present disclosure relates to gunpowder detection and, more particularly, to detection of presence of gunpowder.

BACKGROUND

As background, firearm violence is a pressing issue that is growing on a global scale. Detecting firearms may involve detecting presence of metal in firearms. However, firearms are manufactured in various ways with various materials. For example, printable guns are made with a plastic material, which will not be detected by a metal detector. Another method of detecting firearms may involve determining gunshot events by detecting frequencies resulting from fired guns. However, detecting gunshot events may not prevent shooting before a tragedy unfolds. Therefore, detecting presence of gunpowder is desired.

SUMMARY

In accordance with one embodiment of the present disclosure, a method is provided. The method includes collecting sensor data from a plurality of vehicles each comprising one or more gunpowder sensors, detecting presence of gunpowder based on the sensor data of the gunpowder sensors, determining a detection location where the presence of gunpowder is detected based on vehicle location data from the vehicles, determining whether the detection of the presence of gunpowder is false positive based on the detection location and map data from a crowdsourced map (e.g., a map generated from crowdsourced data including user reports or data from social media, social network, or the like), and communicating the detection of the presence of gunpowder to a server or between the vehicles in response to determining that the detection of the presence of gunpowder is not false positive.

In accordance with another embodiment of the present disclosure, a system includes a plurality of vehicles each comprising one or more gunpowder sensors and a processor configured to perform a method is provided. The method includes collecting sensor data from a plurality of vehicles each comprising one or more gunpowder sensors, detecting presence of gunpowder based on the sensor data of the gunpowder sensors, determining a detection location where the presence of gunpowder is detected based on vehicle location data from the vehicles, determining whether the detection of the presence of gunpowder is false positive based on the detection location and map data from a crowdsourced map, and communicating the detection of the presence of gunpowder to a server or between the vehicles in response to determining that the detection of the presence of gunpowder is not false positive.

These and additional features provided by the embodiments described herein will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods and systems for gunpowder detection. In embodiments disclosed herein, vehicles may be equipped with one or more gunpowder sensors configured to detect presence of gunpowder, and sensor data from the gunpowder sensors are provided for further analysis for detecting false positive of the detection, which may enhance detection accuracy. The determination of false positive may utilize detection location and map data from a crowdsourced map. The determination of false positive may be made by a server, a vehicle, a personal device, or the like which may process and analyze data. The detection of the gunpowder is may be communicated to one or more of the server, the vehicle, and the personal device. The detection of the gunpowder may be communicated between servers, vehicles, and/or personal devices. Since the detection of the gunpowder is communicated when the detection of the presence of gunpowder is not false positive, unnecessary data communications may be reduced to save memory and improve computer performance including speed and efficiency. It is noted that since the determination is based on presence of gunpowder, the methods and systems described herein may prevent gunshot event or other events involving gunpowder before happening.

Figure 1A:
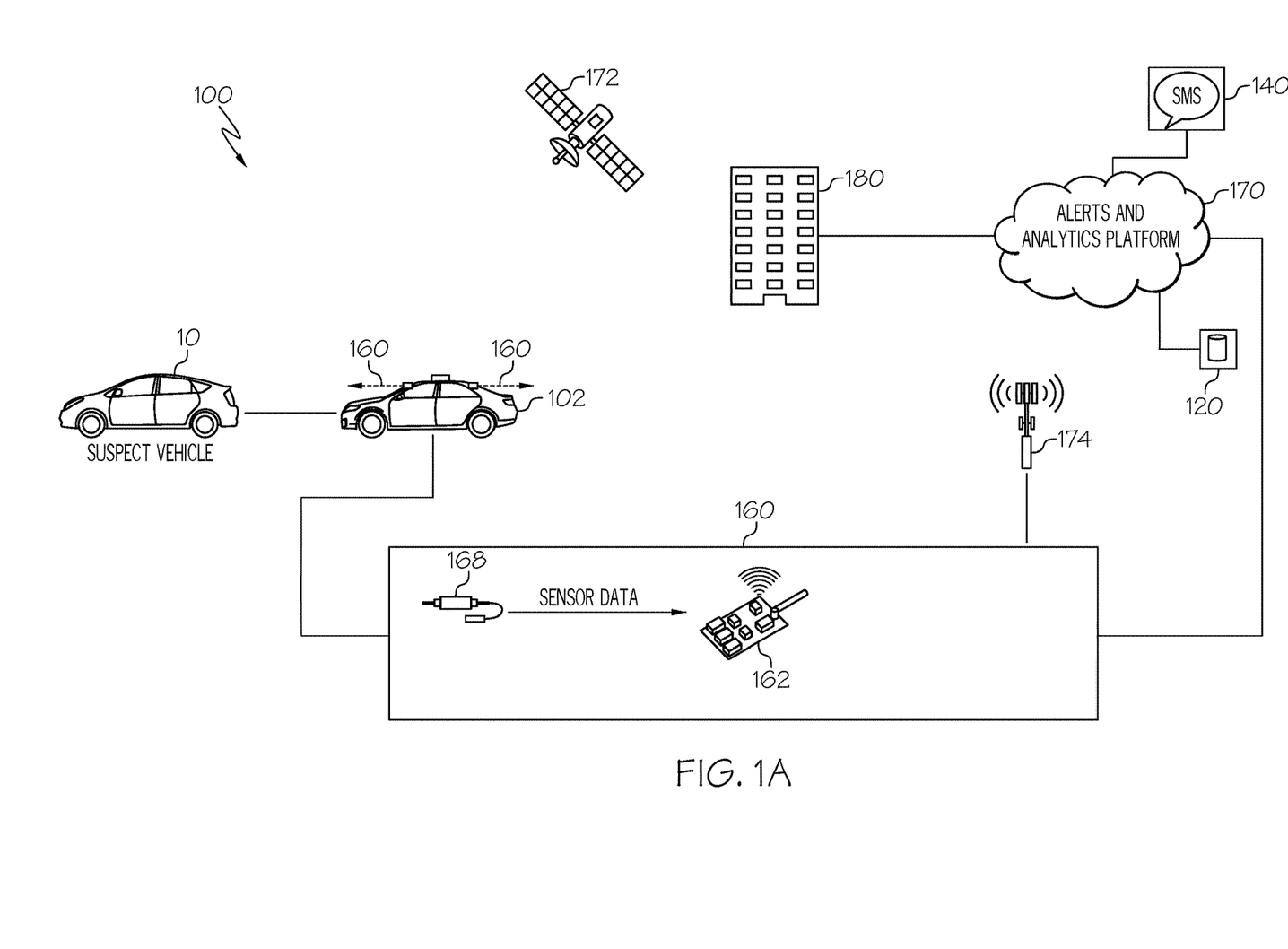
FIG. 1A depicts a schematic diagram of a system, according to one or more embodiments shown and described herein.

Referring to FIG. 1A, an overall system 100 which detects presence of gunpowder based on sensor data is depicted. In embodiments, the system 100 may include a vehicle 102, a gunpowder sensor 160, a server 120, and a personal device 140. While FIG. 1A depicts a single vehicle, single gunpowder sensor, and single personal device, the system 100 may communicate with a plurality of vehicles, a plurality of gunpowder sensors, and a plurality of personal devices. The system 100 may further include a control center 180. For example, the control center 180 may be associated with a government entity or a security system provider.

The vehicle 102 may be a vehicle including an automobile or any other passenger or non-passenger vehicle such as, for example, a terrestrial, aquatic, and/or airborne vehicle. The vehicle 102 may also or instead be a device that may be placed onboard an automobile or any other passenger or non-passenger vehicle such as, for example, a terrestrial, aquatic, and/or airborne vehicle. In some embodiment, the vehicle 102 may be an unmanned aerial vehicle (UAV), commonly known as a drone, that may be able to deliver relatively small and light items to mobile structures on a property. The vehicle 102 may be a public vehicle, such as a police car, a fire truck, a community bus, a taxi, a rideshare vehicle, a tram, a train or the like. The vehicle 102 may be a privately owned vehicle. The public vehicle may have less potential privacy or security issues than the privately owned vehicle associated with data sharing.

The vehicle 102 may be an autonomous and connected vehicle that navigates its environment with limited human input or without human input. The vehicle 102 may be equipped with internet access and share data with other devices both inside and outside the vehicle 102. In embodiments, the vehicle 102 may communicate with the server 120 and transmit its data to the server 120. For example, the vehicle 102 transmits location data associated with its location, speed, and destination, and the like. The location data may be associated with a time. In embodiments, the location data is provided by a Global Position System (GPS) satellite tracking system 172 (e.g., GPS satellites) tracking the location of the vehicle 102.

One or more gunpowder sensor 160 may be mounted to the vehicle 102. For example, the vehicle 102 may have a plurality of gunpowder sensors 160, one facing forward, one facing rearward, one facing inward, and/or one disposed inside of the vehicle 102. The vehicle 102 may have more than one gunpowder sensor 160 to cover a wide area surrounding the vehicle 102 which may enhance the accuracy of the gunpowder sensor 160. In embodiments, the gunpowder sensor 160 may have a sensor 168 sensing a low frequency electric field or the like including sensing technologies that may become available in the future to detect gunpowder and a network interface 162 that may transmit the sensor data via a network 170 (e.g., a cellular tower 174, or the like) to others including the vehicle 102, the server 120, the personal device 140, the control center 180. The network interface 162 may be an onboard vehicular communication system (VC/DCM) or an aftermarket network interface. In embodiments, the gunpowder sensor 160 may be communicatively coupled to the vehicle 102, and the vehicle 102 may send out the sensor data to the network 170. The gunpowder sensor 160 may be pre-installed to the vehicle 102 or installed to order.

The server 120 may be a remote server or a local server including, but not limited to, a roadside unit, an edge server, and the like. While FIG. 1A depicts a single server, the present system may include a plurality of servers that are distributed over a larger area managed by the servers. The server 120 may collect various information about an area surrounding the vehicle 102, such as demographics census data, daily pedestrian traffic data and event information in the area where the vehicle 102 is in operation. The server 120 may collect information from a plurality of areas. The server 120 may also collect keywords, location, and time of each event in the area. The detection of the presence of gunpowder may be communicated to the server 120. The server 120 may send out a notification to the personal device 140, the vehicle 102, or other devices or platforms coupled to the network 170. As described above, the server 120 may provide various functions, such as data storage, application, business logic, artificial intelligence (AI), machine learning (ML), user interface (UI), other system integration capabilities, or the like. The server 120 may provide application logic that may handle all incoming data or data integrations, outgoing data, a content to be displayed on a display, authentication, authorization of access to the system 100, system configurations, logic changes, or the like. The server 120 may act as a brain of the system 100.

The personal device 140 may be communicatively coupled to the vehicle 102 and the server 120 via the network 170. The personal device 140 may be a device for a commercial user. The personal device 140 may include, without limitation, a personal computer, a smartphone, a tablet, a personal media player, or any other electric device that includes communication functionality. The detection of the presence of gunpowder may be communicated to the personal device 140. The personal device 140 may display an image (e.g., a warning sign, text, or the like), play an alarm sound, or the like to alert a user of the personal device 140.

The personal device 140 may receive input of a user regarding information (e.g., keywords, images, or the like) associated with a certain event. For example, the information may include situational information associated with an event involving gunpowder, such as presence of gunpowder, a gunshot event, a bomb attack, or the like. The information may be communicated to the server 120. The server 120 may integrate the information from the personal device 140 to the sensor data from the gunpowder sensor 160 and the vehicle location data from the vehicle 102 to determine whether the presence of gunpowder is false positive. The information may include new information that the gunpowder sensor 160 does not detect or fail to detect, which can be another source information to determine the presence of gunpowder or other similar critical events. The personal device 140 may provide location data of the personal device 140.

Figure 1B:
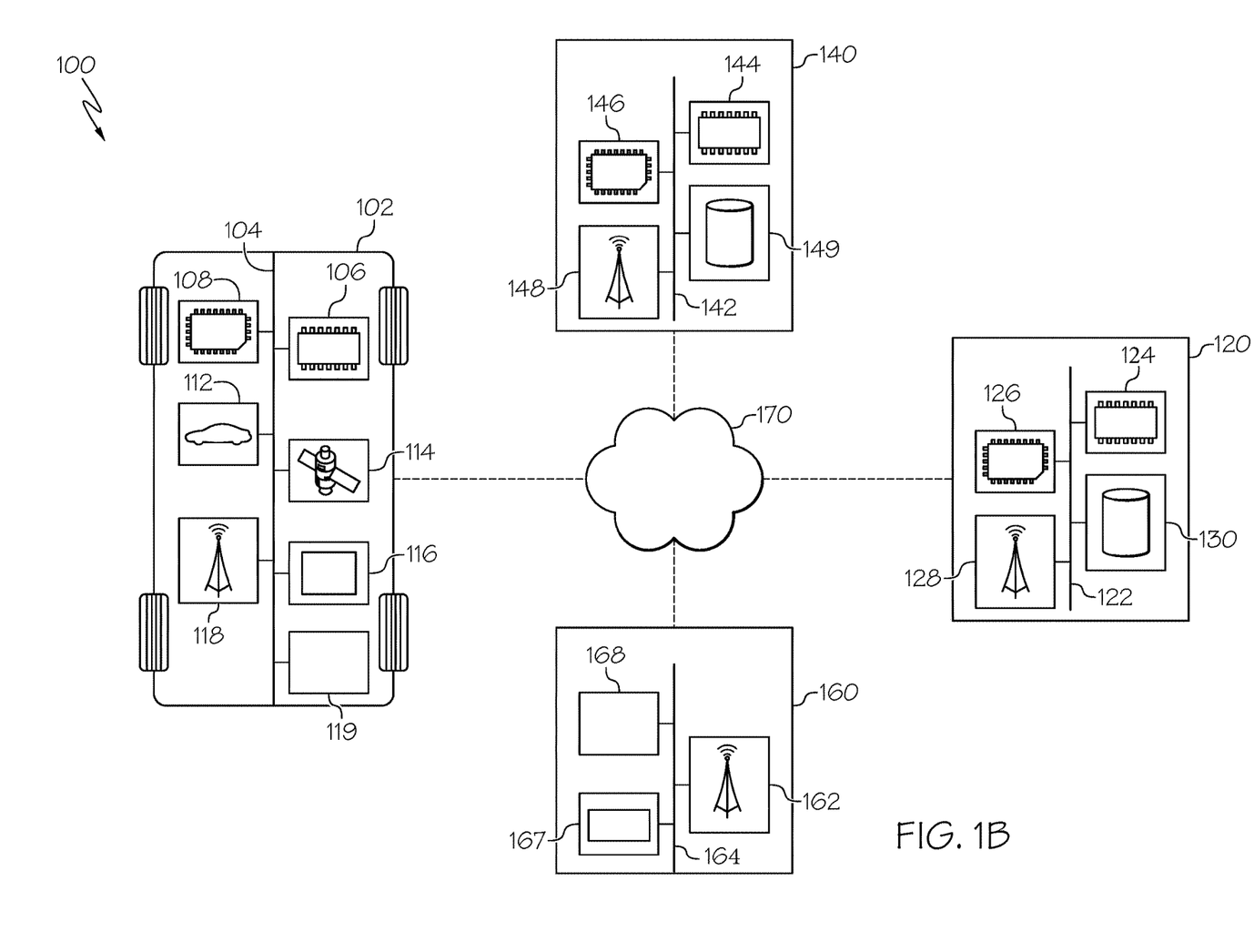
FIG. 1B depicts a schematic diagram of the system of FIG. 1A comprising a vehicle and a server, according to one or more embodiments shown and described herein.

Referring now to FIG. 1B, a schematic diagram of the system 100 comprising the vehicle 102 and the server 120 is depicted. The vehicle 102 may include a processor 108, a memory 106, a driving assist module 112, a network interface 118, a location module 114, and an input/output interface (I/O interface 119). The vehicle 102 also may include a communication path 104 that communicatively connects the various components of the vehicle 102.

The processor 108 may include one or more processors that may be any device capable of executing machine-readable and executable instructions. Accordingly, each of the one or more processors of the processor 108 may be a controller, an integrated circuit, a microchip, or any other computing device. The processor 108 is coupled to the communication path 104 that provides signal connectivity between the various components of the connected vehicle. Accordingly, the communication path 104 may communicatively couple any number of processors of the processor 108 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 106 is coupled to the communication path 104 and may contain one or more memory modules comprising RAM, ROM, flash memories, hard drives, or any device capable of storing machine-readable and executable instructions such that the machine-readable and executable instructions can be accessed by the processor 108. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 102 may also include a driving assist module 112. The driving assist module 112 is coupled to the communication path 104 and communicatively coupled to the processor 108. The driving assist module 112 may include sensors such as LiDAR sensors, RADAR sensors, optical sensors (e.g., cameras), laser sensors, proximity sensors, location sensors (e.g., GPS modules), and the like. The vehicle data gathered by the sensors may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, autonomous driving, and/or the like.

The vehicle 102 also comprises a network interface 118 that includes hardware for communicatively coupling the vehicle 102 to the server 120. The network interface 118 can be communicatively coupled to the communication path 104 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices. The vehicle 102 may connect with one or more other connected vehicles and/or external processing devices (e.g., the server 120) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 114 is coupled to the communication path 104 such that the communication path 104 communicatively couples the location module 114 to other modules of the vehicle 102. The location module 114 may comprise one or more antennas configured to receive signals from the GPS satellite tracking system 172. Specifically, in one embodiment, the location module 114 includes one or more conductive elements that interact with electromagnetic signals transmitted by GPS satellite tracking system 172. The received signal is transformed into a data signal indicative of the location (e.g., latitude and longitude) of the location module 114, and consequently, the vehicle 102.

The vehicle 102 may include a screen 116 that is disposed external to the vehicle 102. The screen 116 may display content that is requested by a user of the personal device 140. For example, the content may be advertisements about products, information about events, and the like.

The vehicle 102 may include an I/O interface 119. The I/O interface 119 may be disposed inside the vehicle 102 such that an occupant of the vehicle 102 may see. The I/O interface 119 may allow for data to be presented to a human driver and for data to be received from the driver. For example, the I/O interface 119 may include a screen to display information to a user, speakers to present audio information to the user, and a touch screen that may be used by the user to input information. The I/O interface 119 may output information that the vehicle 102 received from the server 120. For example, the I/O interface 119 may display instructions to follow a route generated by the server 120, such as turn-by-turn instructions. The I/O interface 119 may display the same content as the one that the screen 116 is displaying such that the occupant of the vehicle 102 may check what is currently displayed on the screen 116 in real time.

In some embodiments, the vehicle 102 may be communicatively coupled to the server 120 by a network 170 via the network interface 118. The network 170 may be a wide area network, a local area network, a personal area network, a cellular network, a satellite network, and the like.

The server 120 comprises a processor 126, a memory component 124, a network interface 128, a data storage 130, and a communication path 122. Each server 120 component is similar in features to its connected vehicle counterpart, described in detail above. It should be understood that the components illustrated in FIG. 1 are merely illustrative and are not intended to limit the scope of this disclosure. More specifically, while the components in FIG. 1 are illustrated as residing within vehicle 102, this is a non-limiting example. In some embodiments, one or more of the components may reside external to vehicle 102, such as with the server 120.

The gunpowder sensor 160 comprises a sensor 168, a network interface 162, a screen 167, and a communication path 164. The network interface 162, the screen 167, and the communication path 164 are similar in features to its connected vehicle counterpart, described in detail above. For example, the network interface 162 may be an onboard vehicular communication system (e.g., a data communication module (DCM) or a vehicle communication (VC) system). In embodiments, the communication path 164 may be communicatively coupled to the communication path of the vehicle 102. In embodiments, the sensor 168 may detect a low frequency electric field naturally occurring from gunpowder or the like. The sensor 168 may utilize sensing technologies that may become available in the future to detect gunpowder. The low frequency electric field passes through barriers and the sensor 168 may detect items contain gunpowder (e.g., loaded firearms, gunpowder bombs placed in vehicles, covered with clothes, or behind walls, or the like). Therefore, the gunpowder sensor 160 may detect gunpowder in other vehicles (e.g., a vehicle 10) or in certain areas (e.g., a shopping center, a parking lot, a geofenced area, an area where a sports event is held (e.g., a stadium or the like), a building (e.g., a government building, a church building, a school building, or the like), or the like). The gunpowder sensor 160 may also detect gunpowder possession of pedestrians. The detection range of the sensor 168 may be about 6 to 8 feet. However, the range may increase as technologies improve.

In embodiments, the gunpowder sensor 160 may provide data associated with a signal strength detected by the sensor 168. The signal strength from the gunpowder sensor 160 may be compared to a threshold strength to determine the presence of gunpowder. For example, it is determined that gunpowder is detected when the signal strength is stronger than the threshold signal. The signal strength may indicate a distance from a location where gunpowder is present. For example, a strong signal may indicate that the detection location is closer than a weak signal is detected. The signal strength may indicate an amount of gunpowder exists. For example, a strong signal may indicate that the amount of gunpowder is more than when a weak signal is detected. It is noted that the gunpowder sensor 160 is detecting the gunpowder itself rather than detecting smoke or other residue from spent gunpowder. Therefore, the gunpowder sensor 160 may be used to detect gunpowder to mitigate possible gunshot or explosion before happening.

In embodiments, the gunpowder sensor 160 may provide data associated with a detection time when the gunpowder sensor 160 detects gunpowder. In embodiments, the detection time may be provided by other components of the system 100 when the components receive the sensor data from the gunpowder sensor 160.

The personal device 140 comprises a processor 146, a memory component 144, a network interface 148, an I/O device 149, and a communication path 142. Each component of the personal device 140 is similar in features to its connected vehicle counterpart, described in detail above. The I/O device 149 may provide an interface for the user to input a user geographic preference and/or a user population preference for her content to be displayed on the screen of the vehicle 102. In some embodiments, bidirectional communication is provided between the personal device 140 and the server 120. The user may input information associated with gunpowder detection via the personal device 140. For example, the user may input a location, time, or any details of an event associated with the gunpowder detection using the personal device 140, and the information may be transmitted to the server 120. The information may be further transmitted from the server 120 to others, such as other personal devices or vehicles. The server 120 may transmit information stored in the server 120 to the personal device 140.

It should be understood that the components illustrated in FIG. 1B are merely illustrative and are not intended to limit the scope of this disclosure. More specifically, while the components in FIG. 1B are illustrated as residing within the vehicle 102, this is a non-limiting example. In some embodiments, one or more of the components may reside external to vehicle 102, such as with the server 120.

Figure 2:
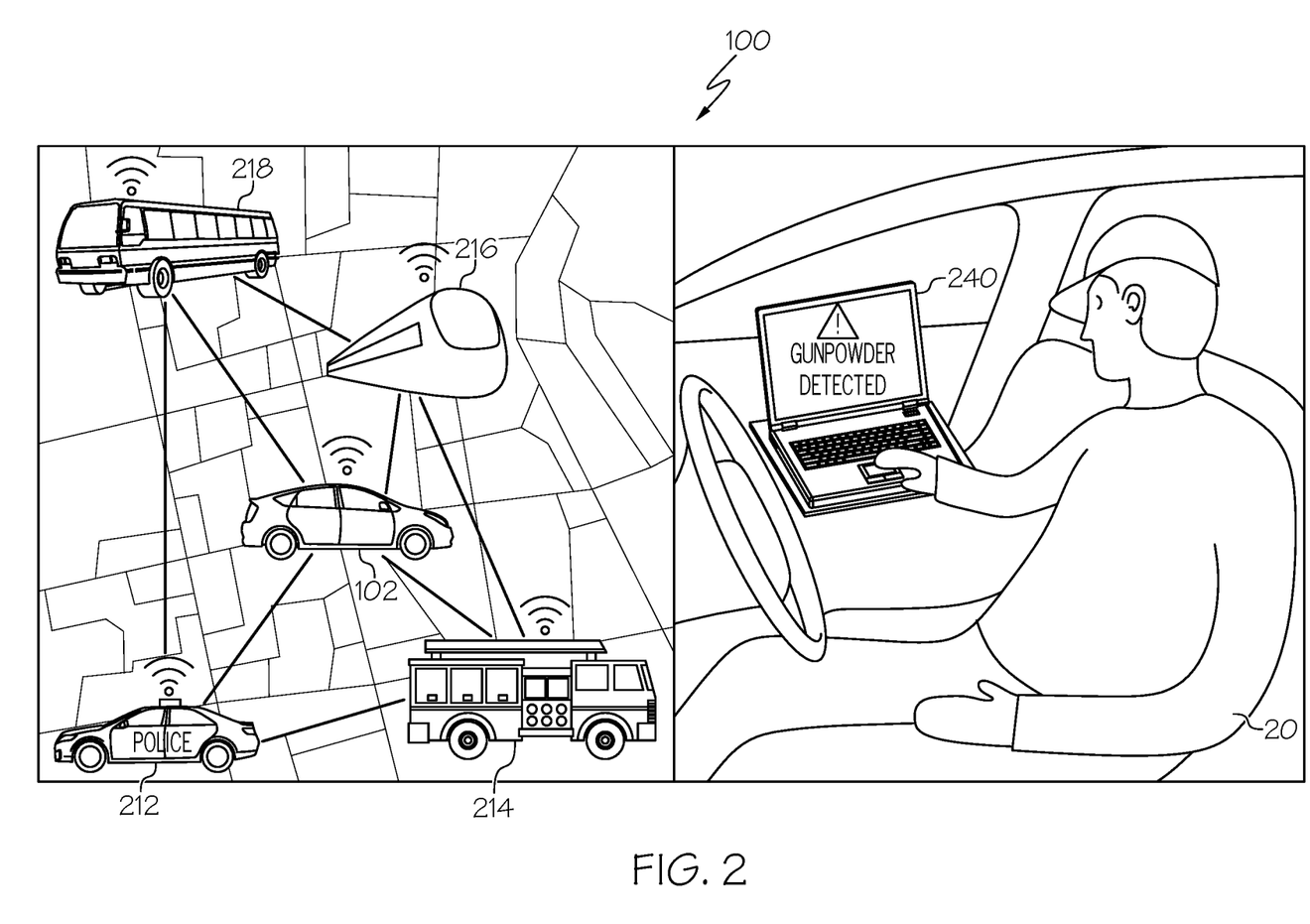
FIG. 2 depicts a schematic diagram of a connected grid, according to one or more embodiments shown and described herein.

Referring to FIG. 2, the system 100 may include a plurality of vehicles 212, 214, 216, 218 communicatively connected (e.g., a connected grid) with each other and the vehicle 102. It is noted that the vehicles 212, 214, 216, 218 are each equipped with a gunpowder sensor (e.g., the gunpowder sensor 160) and include various components similar to the vehicle 102 as described above in connection with the embodiments of FIGS. 1A and 1B, and therefore repeated description will be omitted. Data (e.g., the sensor data, the location data, the vehicle data, or the like) from the vehicles 102, 212, 214, 216, 218 may be transmitted via the network 170 and/or shared between the vehicles 102, 212, 214, 216, 218. In embodiments, the vehicles 102, 212, 214, 216, 218 may be privately owned or publicly owned. For example, the vehicles 102, 212, 214, 216, 218 may include personal vehicles, trains, buses, firetrucks, police cars, or the like.

The system 100 may provide opt-in or opt-out options for the vehicles 102, 212, 214, 216, 218 to share the data, which may help avoid privacy or security issues. For example, the system 100 may have access to the data from vehicles that are opt-in for sharing the data. The vehicles 102, 212, 214, 216, 218 may opt-out from sharing the data. The vehicles 102, 212, 214, 216, 218 may be autonomous vehicles or semi-autonomous vehicles. The data from the vehicles 102, 212, 214, 216, 218 may be shared with the control center 180 (e.g., security companies or law enforcement entities including police, or the like). In embodiments, the data may be shared with a computer 240, which is an example of the personal device 140 as described above in connection with the embodiments of FIGS. 1A and 1B. The data may be shared with only an authorized parties (e.g., security companies or law enforcement entities including police, or the like). A user 20 may be notified of gunpowder detection via the computer 240 such that to take necessary steps to prevent or mitigate the situation.

Figure 3:
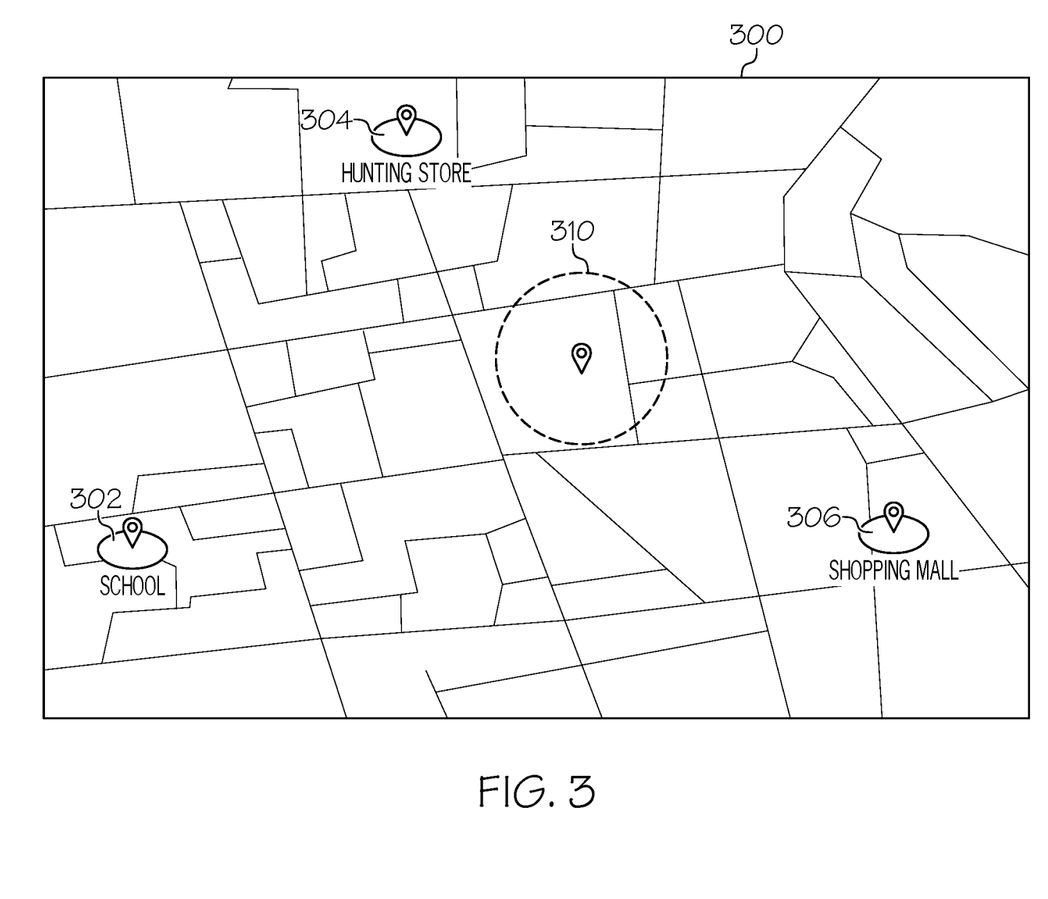
FIG. 3 depicts a crowdsourced map, according to one or more embodiments shown and described herein.

Referring to FIG. 3, a crowdsourced map 300 may be used in the system 100. The crowdsourced map 300 may be generated from map data to create a digital map. The digital map may be used to identify the detection location of gunpowder. The crowdsourced map 300 may provide locations where presence of gunpowder is authorized. For example, a hunting store 304 is authorized to have ammunition. Therefore, when the gunpowder sensor 160 detects presence of gunpowder in the vicinity of the hunting store 304, the detection may be categorized as false-positive when the detection is made within a threshold distance from the hunting store 304. The crowdsourced map 300 may provide locations where presence of gunpowder may pose an increased risk compared to other locations. For example, a school 302 is often exposed to a school shooting, and therefore sensitivity of determination of the gunpowder detection may be increased to prevent false-negative when the detection location is within a threshold distance from the school 302. Similarly, a shopping mall 306 is often exposed to a mass shooting or a destruction involving ammunition. Therefore, sensitivity of determination of the gunpowder detection may be increased to prevent false-negative when the detection location is within a threshold distance from the shopping mall 306. The above examples are non-limiting and the system 100 may adapt to various locations with different circumstances to prevent false-positive or false-negative.

In embodiments, a detection location of gunpowder may be indicated on the crowdsourced map 300. An impacted area 310 may be indicated on the crowdsourced map 300 based on the signal strength of the gunpowder sensor 160. The impacted area 310 may have a larger boundary when a strong signal is detected than when a weak signal is detected. In embodiments, a detection time of gunpowder may be indicated on the crowdsourced map 300.

Figure 4:
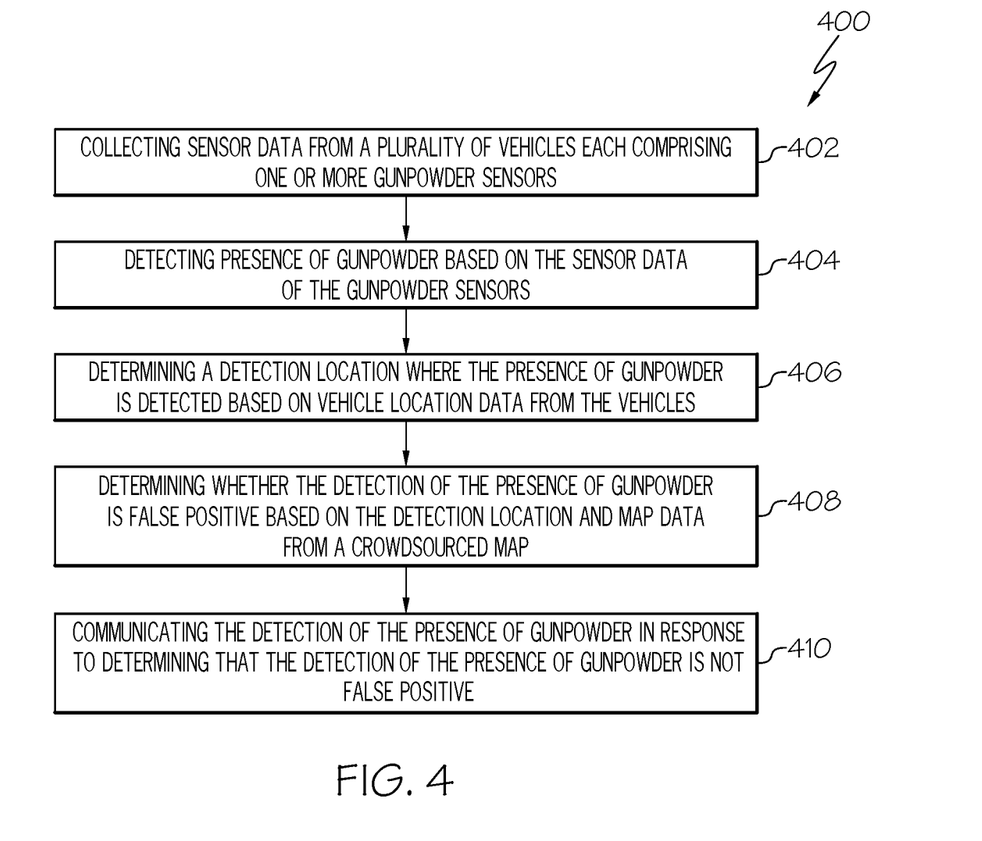
FIG. 4 depicts a flowchart of a method that may be performed by the vehicle and/or server of FIG. 1B, according to one or more embodiments shown and described herein.

Referring to FIG. 4, a flowchart of a method 400 that may be performed by the vehicle 102 and/or server 120 of FIGS. 1A and 1B is depicted. At step 402, sensor data from a plurality of vehicles (e.g., the vehicles 102, 212, 214, 216, 218) each comprising one or more gunpowder sensors (e.g., the gunpowder sensor 160) is collected. For example, the server 120 may collect the sensor data from the gunpowder sensors 160. The sensor data may include the signal strength, the detection location, and/or the detection time. In embodiments, an opt-in request for sharing the sensor data may be received prior to collecting sensor data. Only sensor data allowed to be shared may be collected, which may reduce risks from privacy or security issues. An opt-out request for sharing the sensor data may be received to prohibit unauthorized sharing of sensor data.

At step 404, presence of gunpowder is detected based on the sensor data of the gunpowder sensors (e.g., the gunpowder sensor 160). In embodiments, detecting the presence of gunpowder includes determining a signal strength of the sensor data to be greater than a threshold signal strength. For example, the presence of gunpowder is determined to be detected when the signal strength of the sensor data is greater than the threshold signal strength, and the presence of gunpowder is not determined to be detected when the signal strength of the sensor data is the same as or less than the threshold signal strength.

At step 406, a detection location where the presence of gunpowder is detected is determined based on vehicle location data from the vehicles (e.g., the vehicles 102, 212, 214, 216, 218). For example, the vehicles (e.g., the vehicles 102, 212, 214, 216, 218) may provide location data using the location module 114 based on signals from the GPS satellite tracking system 172.

At step 408, whether the detection of the presence of gunpowder is false positive is determined based on the detection location and map data from a crowdsourced map (e.g., the crowdsourced map 300). For example, the crowdsourced map may provide a digital map indicating the detection location of the presence of gunpowder. In embodiments, the map data may include data associated with a location where presence of gunpowder is authorized. For example, the crowdsourced map 300 provides the map data including the data representing the location where the presence of gunpowder is authorized. The map data may further include authorization information regarding whether the presence of gunpowder is authorized. In embodiments, the location information and/or the authorization information may be provided by the server 120 based on business information, government permit information, or the like stored in or provided to the server 120. In embodiments, the location information and/or the authorization information may be provided by the personal device 140 based on business information, government permit information, or the like stored in or provided by the personal device 140. For example, information provided via social networking interface or communication platform may be incorporated into the map data. The map data may be updated periodically to keep the location information and/or the authorization information up to date.

In embodiments, the detection of the presence of gunpowder may be determined to be false positive when the detection location is within a threshold distance from the location where presence of gunpowder is authorized. For example, the map data may provide data associated with locations of hunting stores (e.g., the hunting store 304). As discussed in conjunction with FIG. 3, for example, the hunting store 304 is authorized to have ammunition. Therefore, when the gunpowder sensor 160 detects presence of gunpowder in the vicinity of the hunting store 304, the detection may be categorized as false-positive when the detection is made within a threshold distance from the hunting store 304. Conversely, in embodiments, the detection of the presence of gunpowder may be determined to be positive when the detection location is outside a threshold distance from the location where presence of gunpowder is authorized.

In embodiments, detecting the presence of gunpowder may include determining a signal strength of the sensor data to be greater than a threshold signal strength. For example, when the signal strength is greater than the threshold signal strength, it is determined that gunpowder is present to prevent false-negative. When the signal is weaker than the threshold signal strength, it may indicate that the signal is de minimis to be considered as the presence of gunpowder is detected.

In embodiments, the threshold signal strength may be increased when the detection location is within a threshold distance from the location where presence of gunpowder is authorized. For example, when the detection location is in the vicinity of the hunting store 304, the threshold signal strength may be increased to reduce false-positive detections. In embodiments, the threshold signal strength may be set to be higher than normal signal strength that is present in the threshold distance from the location where presence of gunpowder is authorized. The normal signal strength may be an average signal strength that is normally present in the threshold distance from the location where presence of gunpowder is authorized.

In embodiments, the map data may include data associated with a location where presence of gunpowder is unauthorized. For example, places, such as schools (e.g., the school 302), shopping centers (the shopping mall 306), hospitals, parks, stadiums, government buildings, or the like do not allow possession of guns or ammunition. The presence of gunpowder at the unauthorized locations may pose an increased risk compared to other locations. Therefore, in embodiments, the detection of the presence of gunpowder may be determined to be positive when the detection location is within a threshold distance from the location where presence of gunpowder is unauthorized.

In embodiments, a time (including a date) of detecting presence of gunpowder is obtained and the crowdsourced map (e.g., the crowdsourced map 300) is updated by adding the detection location and the time of detecting the presence of gunpowder. The threshold distance may be increased or decreased based on the map data and/or the time. For example, when the map data indicates that an event that may attract more people than normal circumstances is held at a certain location, the threshold distance may be increased to be inclusive. The threshold distance may be increased during the event is happening or on the date of the event. Also, in embodiments, the threshold distance may be decreased based on a time and/or a date likely to have less people at a certain location. For example, outside of hours of operation (e.g., working hours, business hours, or the like), the threshold distance may be decreased since risk from incidents involving gunpowder is less than during the hours of operation.

Similarly, the threshold signal strength may be increased or decreased based on the map data and/or the time. For example, when the map data indicates that an event that may attract more people than normal circumstances is held at a certain location, the threshold signal strength may be decreased to be inclusive. The threshold signal strength may be decreased during the event is happening or on the date of the event. Also, in embodiments, the threshold signal strength may be increased based on a time and/or a date likely to have less people at a certain location. For example, outside of hours of operation (e.g., working hours, business hours, or the like), the threshold signal strength may be increased since risk from incidents involving gunpowder is less than during the hours of operation.

At step 410, the detection of the presence of gunpowder is communicated in response to determining that the detection of the presence of gunpowder is not false positive. Therefore, the positive detection of the presence of gunpowder may be communicated as an alert or detection information including the details of the detection (e.g., the sensor data). For example, the positive detection of the presence of gunpowder may be transmitted to the vehicles to draw attention via the I/O interface 119 or to the computer 240 by generating an audible or visible alert or to provide the detection information. The detection of the gunpowder may be communicated to one or more of servers (e.g., the server 120), vehicles (e.g., the vehicles 102, 212, 214, 216, 218), and personal devices (e.g., the personal device 140). The detection of the gunpowder may be communicated between servers, vehicles, and/or personal devices. Communicating detection of gunpowder to the vehicles (e.g., the vehicles 102, 212, 214, 216, 218), or personal devices (e.g., the personal device 140) may be regulated by the server 120 or the control center 180 by the authority based on the criticality of the detection or other critical factors. For example, detection of gunpowder in the vicinity of a school, shopping center, government building, or the like may be determined as critical. The communication regulated based on the criticality may help avoid causing unnecessary public panic.

The communicated detection of the presence of gunpowder may be subject to further analysis. In embodiments, another sensor data from another vehicle at another time is collected. The another vehicle may be located at the detection location when obtaining the another sensor data. For example, the vehicle (e.g., the vehicle 102) drives near the detection location (e.g., the impacted area 310) and detects presence of gunpowder based on the sensor data from the gunpowder sensor (e.g., the gunpowder sensor 160) and the detection of the presence of gunpowder is communicated to a server (e.g., the server 120). Another vehicle (e.g., one or more of the vehicles 212, 214, 216, 218) drives near the detection location (e.g., the impacted area 310) and detects presence of gunpowder based on another sensor data from another gunpowder sensor (e.g., the gunpowder sensor of the other vehicle). A signal strength of the another sensor data from the another vehicle may be used to analyze the communicated detection of the presence of gunpowder from the vehicle (e.g., the vehicle 102).

The further analysis may be provided by determining whether a signal strength of the another sensor data is less than a threshold signal strength. The signal strength of the another sensor data less than the threshold signal strength may indicate that the source of the detection (e.g., items contain gunpowder or gunpowder itself) is moved to different locations and the source of detection is no longer present at the detection location (e.g., the impacted area 310). In response to the determination that the signal strength of the another sensor data is less than the threshold signal strength, the detection location (e.g., the impacted area 310) may be removed from the crowdsourced map (e.g., the crowdsourced map 300). Conversely, when the another sensor data is the same as or stronger than the threshold signal strength, the detection location (e.g., the impacted area 310) may remain on the crowdsourced map (e.g., the crowdsourced map 300).

In embodiments, the determination that the signal strength of the another sensor data is less than the threshold signal strength may be used to determine whether the detection of the presence of gunpowder is false positive. For example, the detection of the presence of gunpowder is false positive when the signal strength of the another sensor data is less than the threshold signal strength. Conversely, the detection of the presence of gunpowder is not false positive (e.g., positive) when the signal strength of the another sensor is the same as or stronger than the threshold signal strength. In embodiments, the determination of false positive may be based on the detection location, the map data from the crowdsourced map, and the another sensor data. It should be noted that the gunpowder detection may be made by a single gunpowder sensor. For example, when one gunpowder sensor senses gunpowder, a signal from the gunpowder sensor may be transmitted to the server and determined as a positive detection. Precautionary actions may be taken based on the signal from the single gunpowder sensor. For example, the precautionary actions may be taken in a sensitive area, such as in the vicinity of a school building or a shopping center.

It should now be understood that methods and systems for detecting gunpowder is provided. A system comprises a plurality of vehicles each comprising one or more gunpowder sensors; and a processor configured to perform a method comprises collecting sensor data from a plurality of vehicles each comprising one or more gunpowder sensors; detecting presence of gunpowder based on the sensor data of the gunpowder sensors; determining a detection location where the presence of gunpowder is detected based on vehicle location data from the vehicles; determining whether the detection of the presence of gunpowder is false positive based on the detection location and map data from a crowdsourced map; and communicating the detection of the presence of gunpowder to a server or between the vehicles in response to determining that the detection of the presence of gunpowder is not false positive. The present systems and methods may provide determination of the presence of gunpowder with enhanced accuracy and efficient data communication. The present systems and methods may also help preventing gunshot events or events involving gunpowder from happening by detecting gunpowder.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
   collecting sensor data from a plurality of vehicles each comprising one or more gunpowder sensors, wherein the sensor data comprises data collected by the one or more gunpowder sensors;
   detecting presence of gunpowder based on a signal strength of a received signal associated with the sensor data of the gunpowder sensors;
   determining a detection location of where the presence of gunpowder is detected, based on vehicle location data associated with the sensor data, of at least one vehicle of the vehicles, the vehicle location data being from a location module of the at least one vehicle, wherein the location module is communicatively coupled to a GPS satellite tracking system;
   determining whether the detection of the presence of gunpowder is false positive based on the detection location and digital map data from a crowdsourced map; and
   communicating the detection of the presence of gunpowder in response to determining that the detection of the presence of gunpowder is not false positive.

2. The method of claim 1, wherein detecting the presence of gunpowder includes determining a signal strength of the sensor data to be greater than a threshold signal strength.

3. The method of claim 1, wherein the gunpowder sensors utilize a low frequency electric field to detect the presence of gunpowder.

4. The method of claim 1, further comprising:
   receiving an opt-in request for sharing the sensor data prior to collecting sensor data; and
   collecting only sensor data allowed to be shared.

5. The method of claim 1, wherein the digital map data includes data associated with a location where presence of gunpowder is authorized.

6. The method of claim 5, wherein the detecting of the presence of gunpowder is determined to be false positive when the detection location is within a threshold distance from the location where presence of gunpowder is authorized.

7. The method of claim 5, wherein:
   detecting the presence of gunpowder includes determining a signal strength of the sensor data to be greater than a threshold signal strength; and
   increasing the threshold signal strength when the detection location is within a threshold distance from the location where presence of gunpowder is authorized.

8. The method of claim 1, wherein the digital map data includes data associated with a location where presence of gunpowder is unauthorized.

9. The method of claim 8, wherein the detecting of the presence of gunpowder is determined to be positive when the detection location is within a threshold distance from the location where presence of gunpowder is unauthorized.

10. The method of claim 8, wherein:
    detecting the presence of gunpowder includes determining a signal strength of the sensor data to be greater than a threshold signal strength; and
    lowering the threshold signal strength when the detection location is within a threshold distance from the location where presence of gunpowder is unauthorized.

11. The method of claim 1, further comprising:
    obtaining a time of detecting the presence of gunpowder; and
    updating the crowdsourced map by adding the detection location and the time of detecting the presence of gunpowder.

12. The method of claim 1, further comprising:
    collecting another sensor data from another vehicle at another time, the another vehicle being located at the detection location when obtaining the another sensor data;
    determining whether a signal strength of the another sensor data is less than a threshold signal strength; and
    removing the detection location from the crowdsourced map in response to determining that the signal strength of the another sensor data is less than the threshold signal strength.

13. A system comprising:
    a plurality of vehicles each comprising one or more gunpowder sensors; and
    a processor configured to execute machine-readable and executable instructions to:
    collect sensor data from a plurality of vehicles each comprising one or more gunpowder sensors, wherein the sensor data comprises data collected by the one or more gunpowder sensors;

detect presence of gunpowder based on a signal strength of a received signal associated with the sensor data of the gunpowder sensors;

determine a detection location of where the presence of gunpowder is detected, based on vehicle location data associated with the sensor data, of at least one vehicle of the plurality of vehicles, the vehicle location data being from a location module of the at least one vehicle, wherein the location module is communicatively coupled to a GPS satellite tracking system;

determine whether the detection of the presence of gunpowder is false positive based on the detection location and digital map data from a crowdsourced map; and communicate the detection of the presence of gunpowder in response to determining that the detection of the presence of gunpowder is not false positive.

14. The system of claim 13, wherein to detect the presence of gunpowder includes the processor being configured to execute machine-readable and executable instructions to determine a signal strength of the sensor data to be greater than a threshold signal strength.

15. The system of claim 13, wherein the gunpowder sensors utilize a low frequency electric field to detect the presence of gunpowder.

16. The system of claim 13, wherein the processor is further configured to execute machine-readable and executable instructions to:

receive an opt-in request for sharing the sensor data prior to collecting sensor data; and collect only sensor data allowed to be shared.

17. The system of claim 13, wherein the digital map data includes data associated with a location where presence of gunpowder is authorized.

18. The system of claim 13, wherein the digital map data includes data associated with a location where presence of gunpowder is unauthorized.

19. The system of claim 13, wherein the processor is further configured to execute machine-readable and executable instructions to:

obtain a time of detecting the presence of gunpowder; and update the crowdsourced map by adding the detection location and the time of detecting the presence of gunpowder.

20. The system of claim 13, wherein the processor is further configured to execute machine-readable and executable instructions to:

collect another sensor data from another vehicle at another time, the another vehicle being located at the detection location when obtaining the another sensor data;

determine whether a signal strength of the another sensor data is less than a threshold signal strength; and remove the detection location from the crowdsourced map in response to determining that the signal strength of the another sensor data is less than the threshold signal strength.

* * * * *

UNITED STATES PATENT AND TRADEMARK OFFICE
CERTIFICATE OF CORRECTION

Page 1 of 1

PATENT NO. : 12,379,518 B2
APPLICATION NO. : 18/297095
DATED : August 5, 2025
INVENTOR(S) : Gupta G. K. Wijeratne It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 2, Line(s) 33, after "gunpowder", delete "is".

In Column 2, Line(s) 43, delete "event" and insert --events--, therefor.

In Column 2, Line(s) 62, delete "embodiment" and insert --embodiments--, therefor.

In Column 3, Line(s) 15, delete "position" and insert --positioning--, therefor.

In Column 4, Line(s) 22, delete "fail" and insert --fails--, therefor.

In Column 4, Line(s) 22, after "source", insert --of--.

In Column 5, Line(s) 26, delete "on" and insert --in--, therefor.

In Column 7, Line(s) 38, after "than", insert --when--.

In Column 8, Line(s) 34, before "opt-in", delete "are".

In Column 8, Line(s) 44, before "authorized", delete "an".

In Column 12, Line(s) 60, delete "preventing" and insert --prevent--, therefor.

Signed and Sealed this
Twenty-seventh Day of January, 2026

John A. Squires
*Director of the United States Patent and Trademark Office*